(12) United States Patent
Edwards et al.

(10) Patent No.: US 9,188,007 B2
(45) Date of Patent: Nov. 17, 2015

(54) GAS TURBINE SHAFT BEARING SYSTEM SERVICE TOOL AND BEARING SYSTEM SERVICE METHOD

(71) Applicants: James B. Edwards, Sanford, FL (US); Cezar Cisloiu, Monroeville, PA (US)

(72) Inventors: James B. Edwards, Sanford, FL (US); Cezar Cisloiu, Monroeville, PA (US)

(73) Assignee: Siemens Energy, Inc., Orlando, FL (US)

( * ) Notice: Subject to any disclaimer, the term of this patent is extended or adjusted under 35 U.S.C. 154(b) by 351 days.

(21) Appl. No.: 13/927,582

(22) Filed: Jun. 26, 2013

(65) Prior Publication Data

US 2015/0000131 A1 Jan. 1, 2015

(51) Int. Cl.
*F01D 5/00* (2006.01)
*F01D 25/16* (2006.01)
*F01D 25/28* (2006.01)

(52) U.S. Cl.
CPC ............... *F01D 5/005* (2013.01); *F01D 25/16* (2013.01); *F01D 25/285* (2013.01); *Y10T 29/49318* (2015.01); *Y10T 29/49696* (2015.01); *Y10T 29/49698* (2015.01); *Y10T 29/49822* (2015.01); *Y10T 29/53* (2015.01); *Y10T 29/5383* (2015.01); *Y10T 29/5397* (2015.01); *Y10T 29/53796* (2015.01); *Y10T 29/53961* (2015.01); *Y10T 29/53974* (2015.01); *Y10T 29/53983* (2015.01)

(58) Field of Classification Search
CPC .................. Y10T 29/49696; Y10T 29/49698; Y10T 29/49318; Y10T 29/53796; Y10T 29/5383; Y10T 29/53961; Y10T 29/5397; Y10T 29/53974; Y10T 29/53983; Y10T 29/49815; Y10T 29/4819; Y10T 29/49822; F01D 5/005; F01D 25/285; F01D 25/16
See application file for complete search history.

(56) References Cited

U.S. PATENT DOCUMENTS

| | | | | |
|---|---|---|---|---|
| 3,217,395 | A * | 11/1965 | McBroom et al. | 29/252 |
| 3,403,434 | A | 10/1968 | Calabro | |
| 3,467,811 | A | 9/1969 | Consoletti | |
| 3,790,356 | A * | 2/1974 | Bergling | 29/281.5 |
| 4,485,542 | A * | 12/1984 | Vasoll | 29/252 |
| 5,383,652 | A * | 1/1995 | Van Den Berg | 269/17 |
| 8,127,417 | B1 * | 3/2012 | Butler et al. | 29/255 |
| 8,814,512 | B2 * | 8/2014 | Skaustein et al. | 415/213.1 |
| 2012/0151735 | A1 | 6/2012 | Thomas | |

FOREIGN PATENT DOCUMENTS

EP 0050796 A1 5/1982

* cited by examiner

*Primary Examiner* — Jason L Vaughan

(57) ABSTRACT

A gas turbine shaft bearing system (bearing and/or seal component) service method and service tool that applies biasing force between a gas turbine shaft and a bearing system component supporting the shaft, so that the bearing system component can be removed or installed. The bearing system service tool is coupled directly to the bearing system component and the shaft, preferably without the need for external fixtures. A biasing force generator, such as a hydraulic unit applies a force on the bearing system component to cause component movement on or off the shaft. Counter-biasing forces are resisted by the fixed position turbine shaft. By exerting biasing force directly between the turbine shaft and bearing system component the service tool can be constructed of smaller, man portable components that are more easily maneuvered within relatively confined turbine service spaces, which are common in field installations.

17 Claims, 16 Drawing Sheets

GAS TURBINE SHAFT BEARING SYSTEM SERVICE TOOL AND BEARING SYSTEM SERVICE METHOD

BACKGROUND OF THE INVENTION

1. Field of the Invention

The invention relates to gas turbine shaft bearing system service method and a gas turbine shaft bearing system service tool that facilitates axial sliding movement of the bearing system bearing and seal assemblies on the shaft during removal and installation service. The tool causes the bearing system bearing and seal assemblies to slide relative to the shaft by application of axial biasing force between the axially fixed position shaft and the bearing or seal of the bearing assembly within the bearing housing envelope. The tool is preferably operable without the need for external fixtures for application of the bearing or seal sliding biasing force, so that it can be man portable and operable within confined field installation spaces.

2. Description of the Prior Art

Industrial gas turbine rotor shafts are supported on bearing systems, including for example an exhaust bearing system within a bearing housing of a single piece exhaust ("SPEX"). A bearing system comprises a seal inboard within the bearing housing and a bearing outboard within the housing that have axially tandem positions circumscribing the rotor shaft. During scheduled turbine shut downs bearing assemblies are removed and replaced in the field installation. It is desirable to return a gas turbine to service as soon as reasonably possible so that it can generate power for the electric grid.

The schematic drawing FIGS. 1-3 show a known gas turbine single piece exhaust (SPEX) 30 tunnel having an external mounting flange 31. Bearing housing 32 is oriented within the tunnel and has a bearing housing end surface 34 and bearing recess 36 in which is retained the slidably moveable bearing system assembly 38A that includes the inboard mounted seal 38B and bearing 38. The bearing assembly 38A separate bearing 38 and the seal 38B are removed and installed serially in the same way by the tool and method embodiments of the present invention. For conciseness of this description, future reference to the bearing system 38A will be focused on the bearing assembly 38, but it should be understood that the same tools and methods are applicable to installation and removal of the seal 38B of the same bearing system 38A. Turbine rotor shaft 40 is supported in the bearing assembly 38 of the bearing system 38A, and has an end face 42 that often includes threaded apertures 44. The bearing 38 is removed and installed with an external bearing replacement fixture 50, which includes a massive sled 52 that rests on the gas turbine pad support structure. The sled 50 supports a hydraulic unit 54 that with hydraulic pump 55 generates the axial biasing force needed to remove and install the bearing assembly 38. A bearing skid 56 may be utilized to bridge the gap between the bearing housing 32 and the sled 52, to provide a convenient resting surface for the bearing assembly 38 prior to it insertion on or removal from the shaft 40. A bearing puller ring 57 is affixed to the external axial face of the bearing assembly 38. The bearing puller ring 57 is coupled to bearing puller rods 58, which are in turn coupled to the hydraulic unit 54 for exerting a pulling or tensile biasing force that extracts the bearing assembly 38 from the bearing recess 36 and the shaft 40. When the bearing assembly 38 is separated from the shaft 40 it may be placed on the bearing skid 56. For bearing reinstallation, the bearing assembly 38 is inserted over the shaft 40, if desired with the assistance of the bearing skid 56, and compressively biased into the bearing recess 36 by interposing stiff slender members between the bearing assembly and the hydraulic unit.

An alternative embodiment of a known self-supporting bearing skid 60 is shown in FIG. 2, which comprises a pair of bearing support tubes 62 flanking left and right sides of the bearing assembly 38 to provide resting surfaces. Each bearing support tube 62 is coupled to the bearing housing end surface 34 by long screws 64 or threaded rods with mating nuts (not shown). Bearing support tube truss 66 is coupled to the turbine exhaust flange 31. The bearing skid 60 is attached directly to the turbine exhaust housing 30 as a free standing unit without the need to support an end on the turbine sled 52. In this way the turbine sled 52 may be maneuvered independent from the bearing skid 60, allowing more positioning flexibility in the field.

In a manufacturing or remote service facility the replacement fixture 50 and sled 52 may be permanently mounted on the factory floor, with the gas turbine moved to different locations within the factory for different fabrication or service operations. In an operational power generating plant field environment the bear replacement fixture 50 including the massive sled 52 are brought to the site and placed on the turbine pad support structure with cranes or hoists within a relatively confined service space that is populated by piping, cables and other power generation equipment. The sled 52 is too large and bulky for man-carrying portability, as it must have sufficient mass to avoid inadvertent movement as the hydraulic unit exerts axial biasing force to insert or remove a bearing assembly 38.

Thus, a need exists in the art for a man-portable gas turbine bearing service method and service tool that can be carried to a field site and installed directly in the bearing housing without the need for cranes or hoists. Advantageously the man-portable gas turbine bearing service tool components are sufficiently small so that they can be readily maneuvered within relatively tight confines of a gas turbine support pad service space.

SUMMARY OF THE INVENTION

Accordingly, an object of the invention is to create a method for servicing gas turbine shaft bearing systems and a man-portable gas turbine bearing system service tool that can be carried to a field site and installed directly in the bearing housing without the need for cranes or hoists.

Another object of the invention is to create a man-portable gas turbine bearing system service tool that can be readily maneuvered within relatively tight confines of a gas turbine support pad service space.

These and other objects are achieved in accordance with the invention by a gas turbine shaft bearing system service method and service tool that applies biasing force between a gas turbine shaft and a bearing system seal and/or the bearing assembly supporting the shaft, so that the bearing system components can be removed or installed. In embodiments of the invention the bearing service tool is coupled directly to the bearing and/or seal of the bearing system and the shaft, preferably without the need for external fixtures. A biasing force generator, such as a hydraulic unit applies a force on the bearing system components to cause the component movement on or off the shaft. Counter-biasing forces are resisted by the fixed position turbine shaft. By exerting biasing force directly between the turbine shaft and bearing system bearing and/or seal the service tool can be constructed of smaller, man portable components that are more easily maneuvered within relatively confined turbine service spaces, which are common in field installations. Elimination of the need to maneuver relatively heavy external skids with cranes and hoists simplifies bearing system service. Cost savings are realized by elimination of the need for heavy equipment to maneuver and transport known external bearing system service tool skids, and by replacing them with simpler, lighter weight bearing system service tools of the invention.

Embodiments of the bearing system service tool feature a first member adapted for coupling to a gas turbine rotor shaft and a second member adapted for coupling to a gas turbine shaft bearing system assembly bearing and/or seal. A biasing force generating unit, such as a hydraulic unit is coupled to the first and second members, for biasing the first and second members relative to each other so as to slide the bearing system component relative to the shaft.

Other embodiments of the bearing system service tool feature a rotor cap adapted for coupling to a gas turbine rotor shaft concentrically therewith having an outer circumferential profile adapted for slidable engagement with a bearing system assembly bearing or seal. A first member is adapted for coupling to the rotor cap, having at least one shaft stud having a distal end coupled to the rotor cap and a shaft stud proximal end. A bearing ring is coupled to an outer axial face of a shaft supporting bearing assembly or seal of the bearing system. A second member is adapted for coupling to the bearing ring. The second member has at least one bearing rod having a distal end coupled to the bearing ring and a bearing rod proximal end. The service tool has a pivoting hub assembly having first and second hub plates pivotally coupled and radially displaceable relative to each other along a pivot axis. The first hub plate is coupled to the at least one first member shaft stud proximal end, and the second hub plate coupled to the at least one second member bearing rod distal end, so as to facilitate selective rotational indexing and concentricity alignment variances between the first and second members. At least one biasing force generating hydraulic unit is coupled to the pivoting hub assembly, for biasing the first and second members relative to each other, so as to slide the bearing system assembly bearing or seal relative to the shaft.

Embodiments of the turbine bearing service method feature coupling a first member to a gas turbine rotor shaft; coupling a second member to a gas turbine shaft bearing system assembly bearing or seal; and coupling a biasing force generating unit (e.g., one or more hydraulic units, pneumatic cylinders, screws, rack and pinion mechanisms, as well as pawl and ratchet mechanisms) to the first and second members. The biasing unit biases the first and second members relative to each other, so as to slide the bearing system assembly bearing or seal component relative to the shaft.

The objects and features of the invention may be applied jointly or severally in any combination or sub-combination by those skilled in the art.

BRIEF DESCRIPTION OF THE DRAWINGS

The teachings of the invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of embodiments of the invention can be readily utilized in a gas turbine shaft bearing system service methods and service tools that apply biasing force between a gas turbine shaft and a bearing system seal or bearing assembly supporting the shaft, so that the bearing component can be removed or installed. In embodiments of the invention the bearing service tool is coupled directly to the bearing system bearing or seal and the shaft, preferably without the need for external fixtures. A biasing force generator, such as a hydraulic unit applies a force on the bearing system component to cause bearing movement on or off the shaft. Counter-biasing forces are resisted by the fixed position turbine shaft. Embodiments of the service tool can be constructed of smaller, man portable components that are more easily maneuvered within relatively confined turbine service spaces, which are common in field installations.

Figure 1:
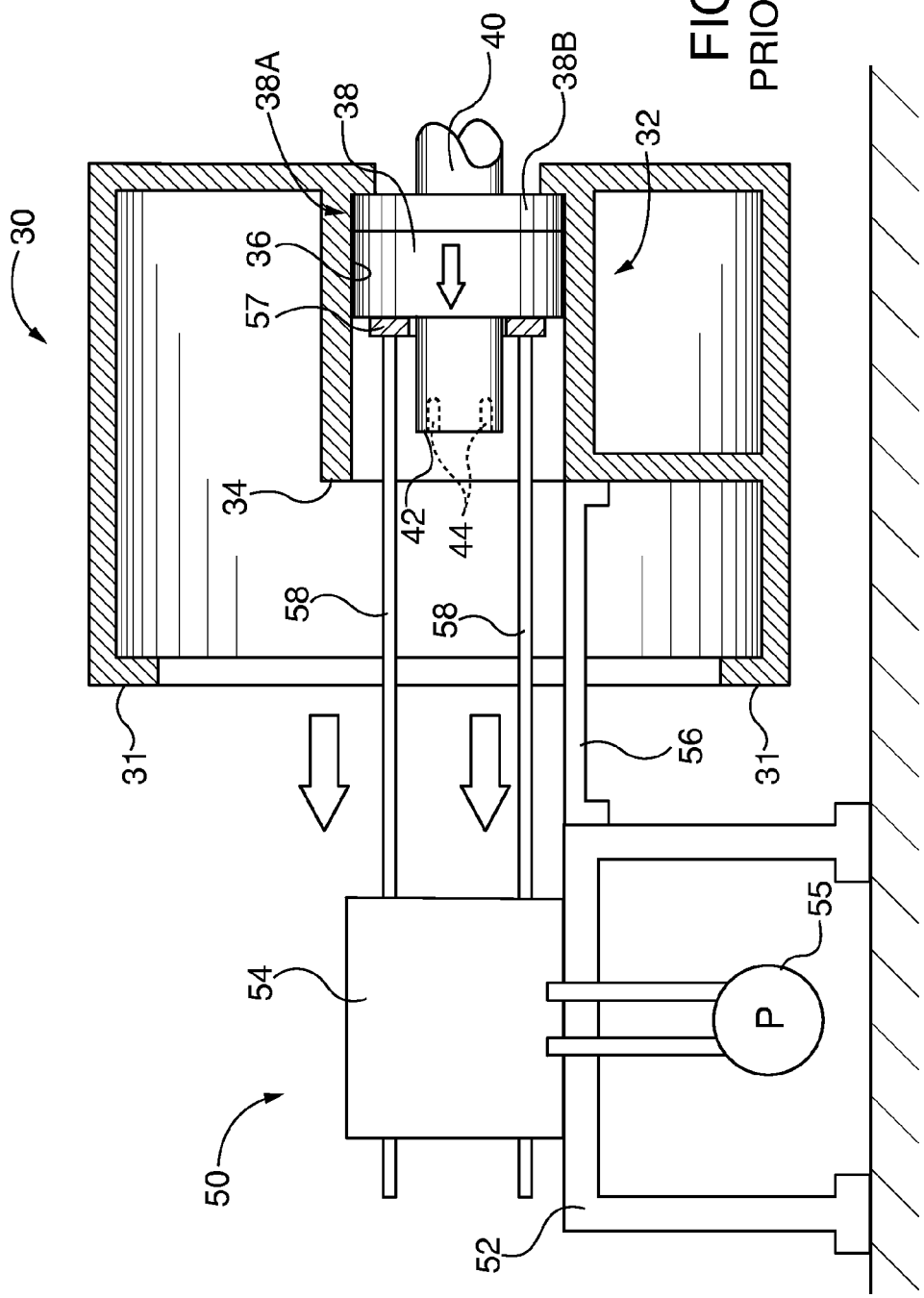
FIG. 1 is a schematic elevational view of a known externally mounted bearing system service tool and bearing skid removing a gas turbine bearing assembly that supports a rotor shaft from a gas turbine bearing housing, while leaving the seal in the bearing housing.
Figure 2:
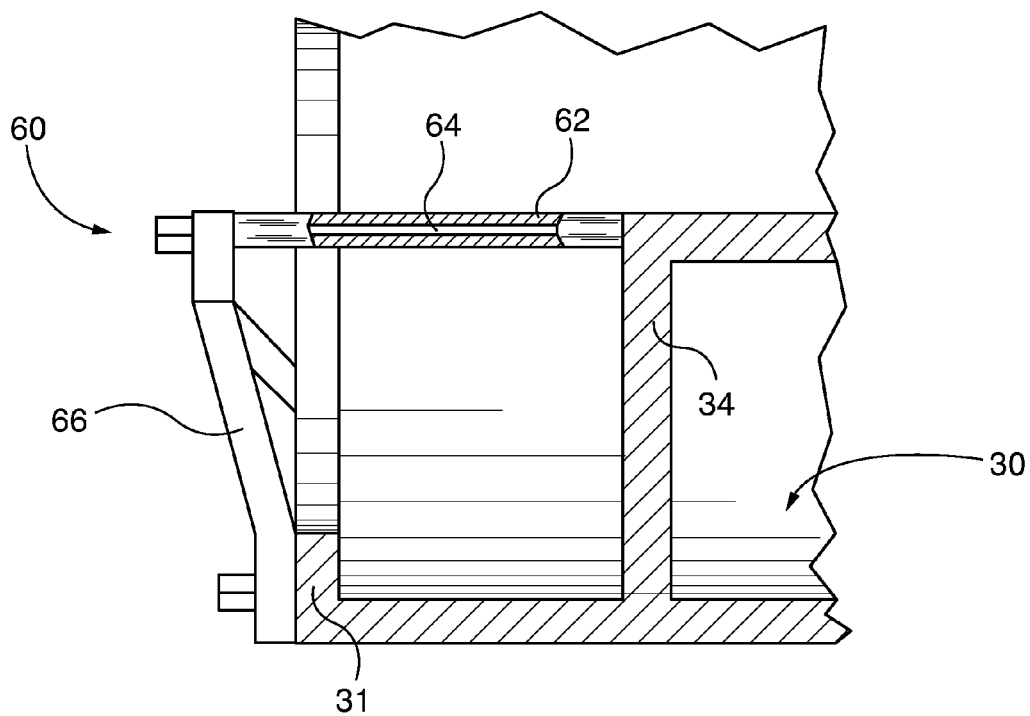
FIG. 2 is a schematic elevational view of another embodiment of a bearing skid.
Figure 3:
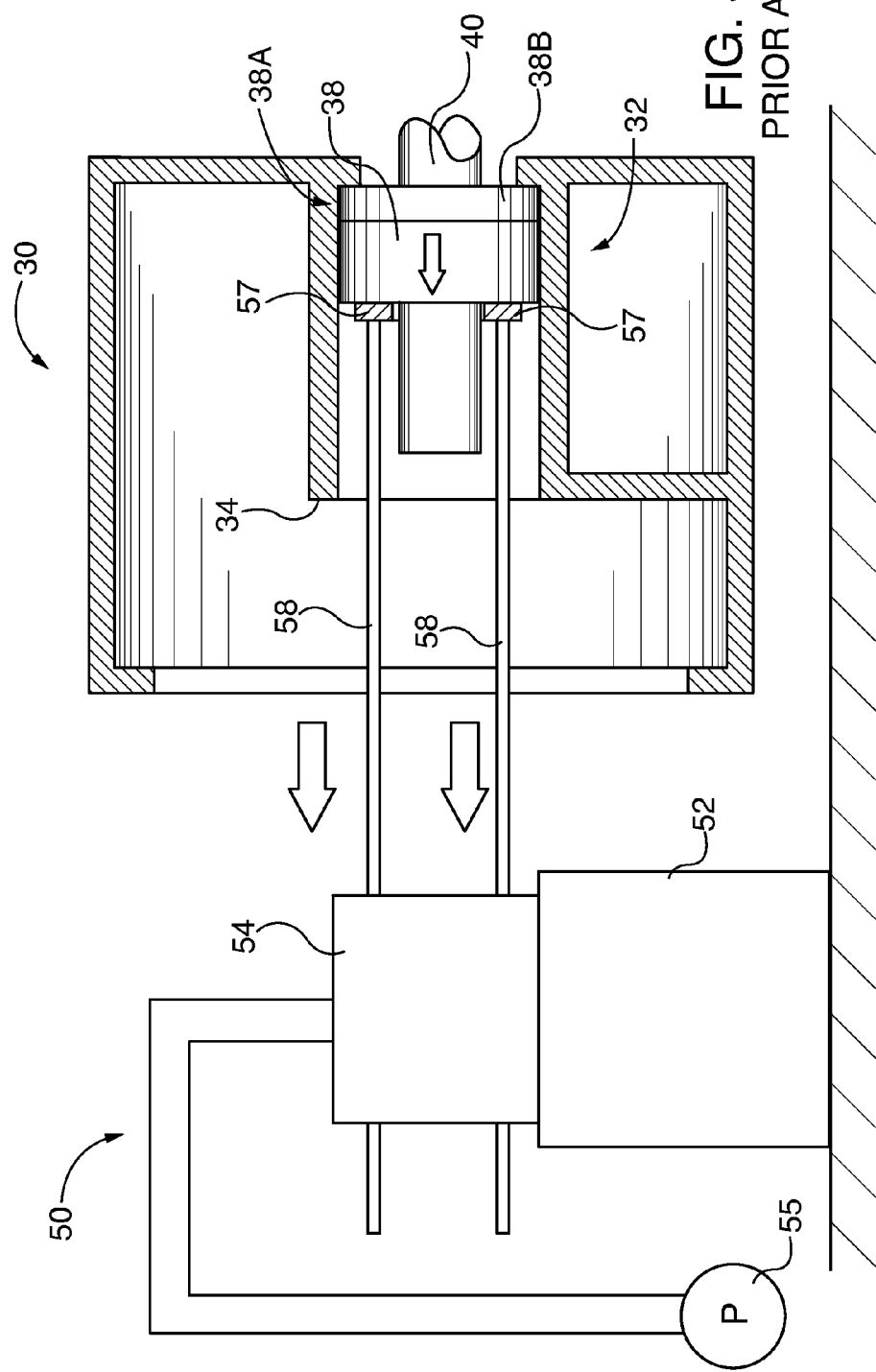
FIG. 3 is a simplified schematic elevational view of a known externally mounted bearing system service tool removing a bearing assembly.
Figure 4:
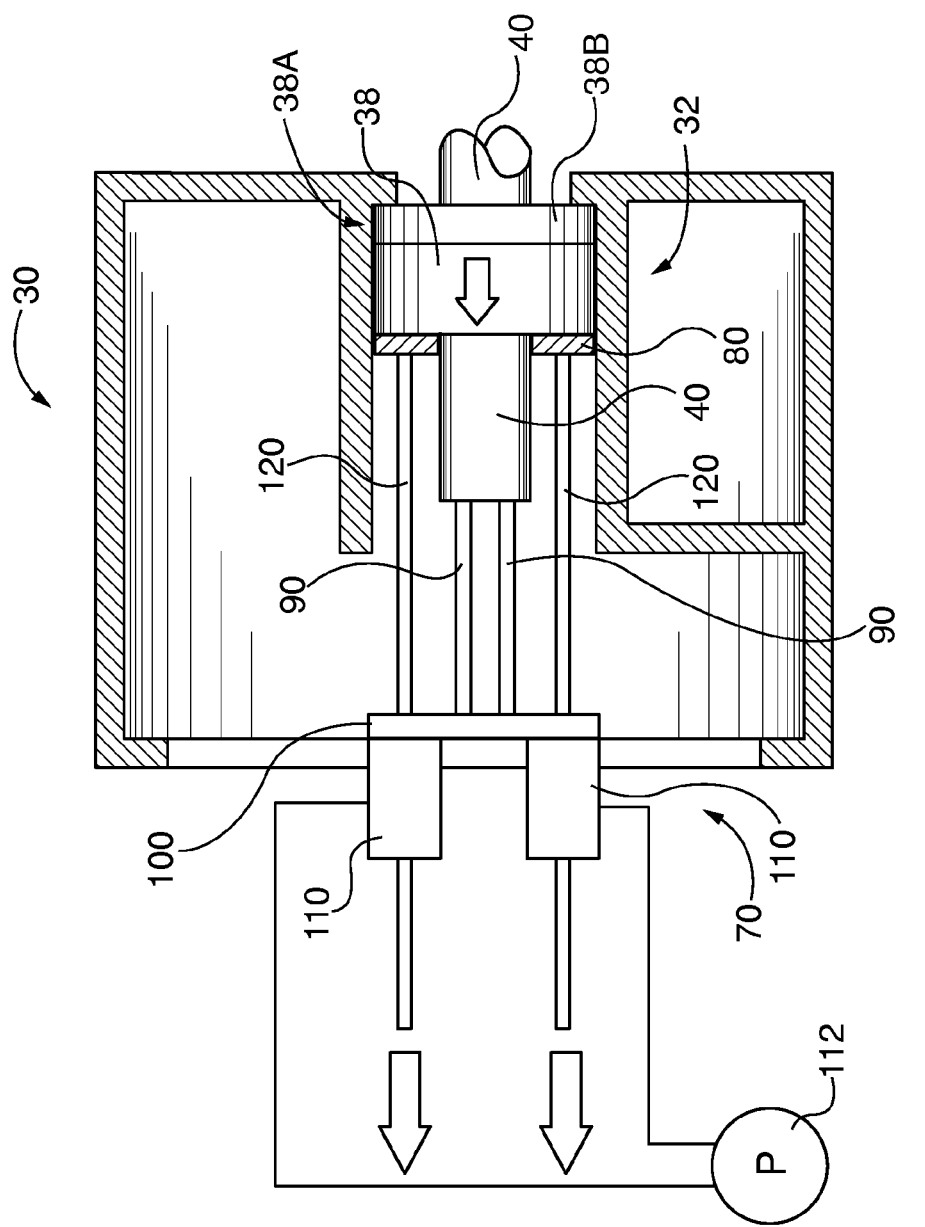
FIG. 4 is a simplified schematic elevational view of an embodiment of a bearing system service tool of the invention that is coupled to the turbine shaft and bearing assembly without any external fixtures or other components, an embodiment of a bearing system support bracket and method for extracting a bearing system bearing or seal component.
Figure 5:
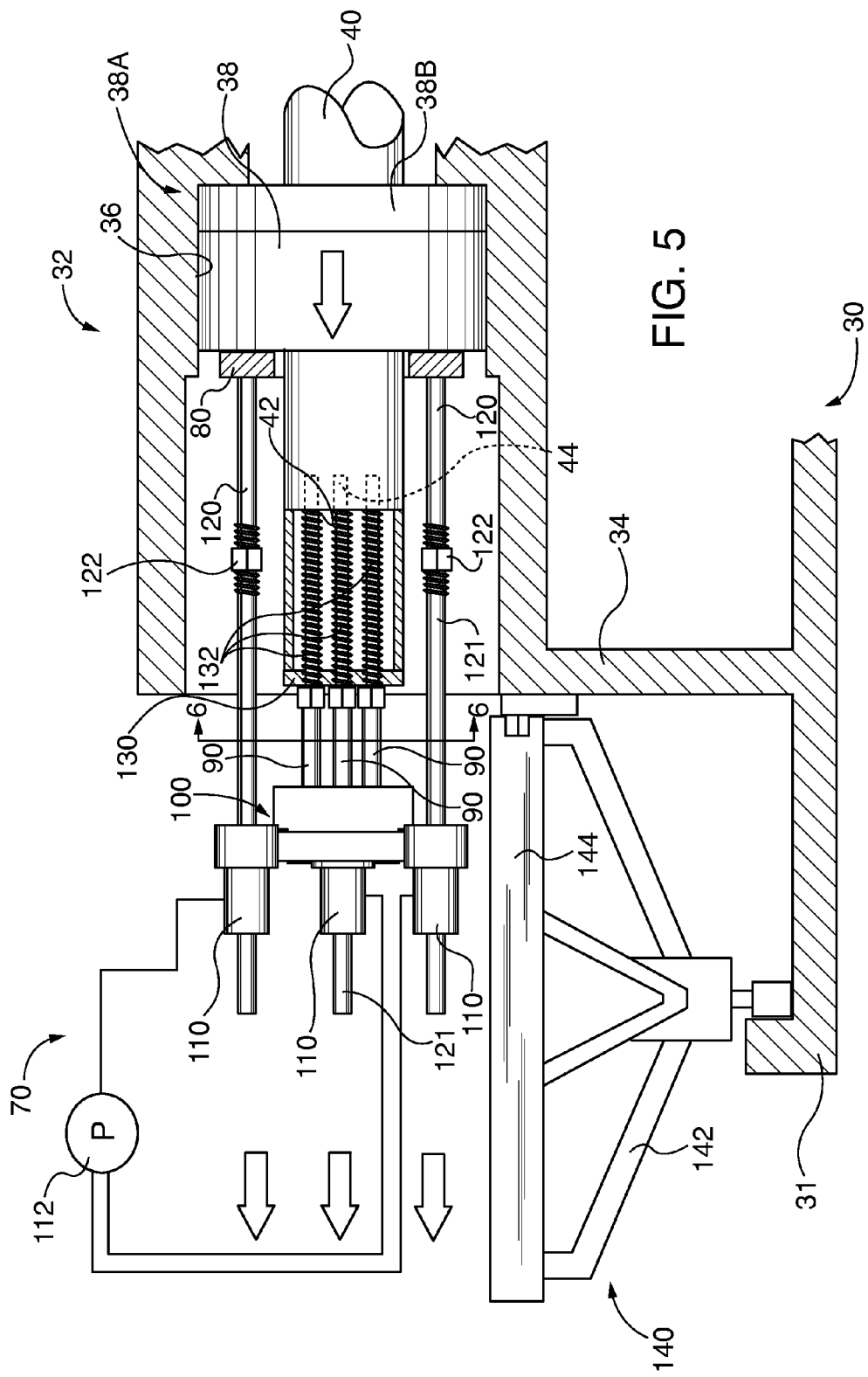
FIG. 5 is a detailed elevational view of a first embodiment of a bearing system service tool of the invention extracting a bearing assembly that is directly coupled to the turbine shaft and the bearing assembly.
Figure 6:
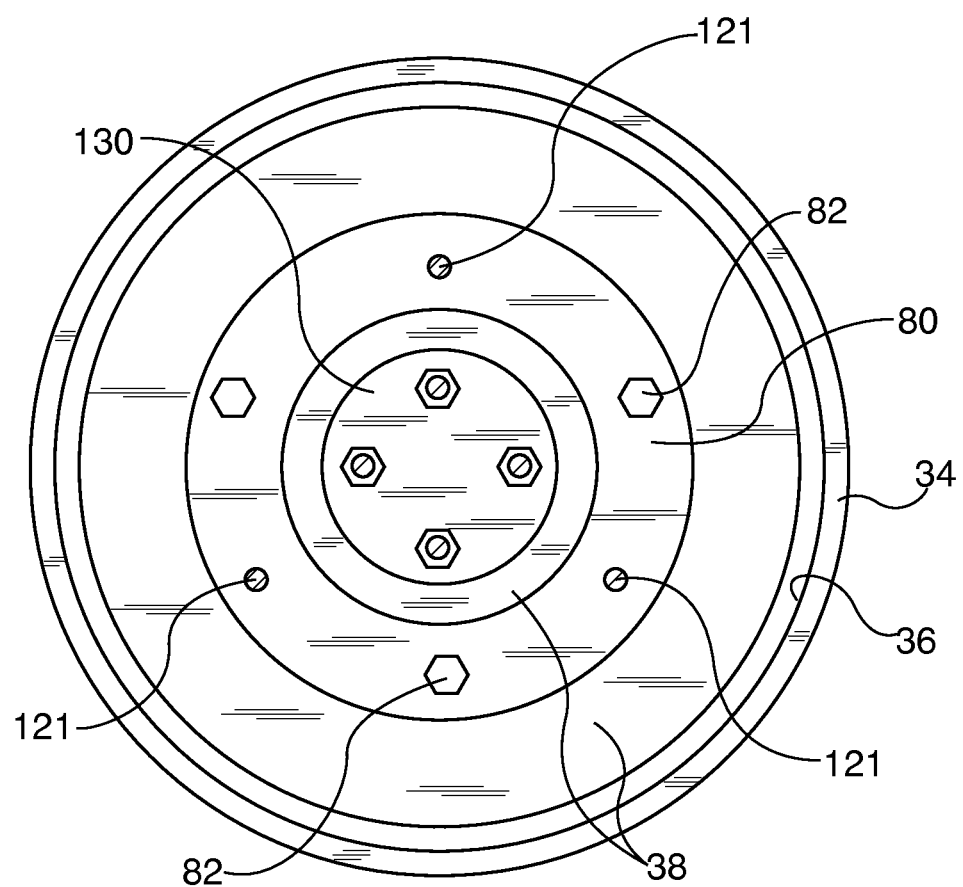
FIG. 6 is a cross sectional elevational view of the bearing system service tool taken along 6-6 of FIG. 5.

Benefits of the invention are highlighted in the side-by-side comparison of the known prior art bearing system service tool 50 of FIG. 3 to the first embodiment bearing system service tool 70 of FIG. 4. In the invention the shaft mounted service tool 70 is coupled to the shaft 40 and a bearing ring 80, without need for any other external support structure, such as the sled 52 of the known prior art bearing service tool 50. Shaft studs 90 are coupled to the rotor shaft 40 and puller hub assembly 100. Hydraulic units 100 are coupled to the puller hub assembly 100, where they are selectively pressurized by hydraulic pump 112 that in turn reciprocate the bearing puller rods 120. As the bearing puller rods are tensioned by the hydraulic units they extract the bearing ring 80 and its attached bearing assembly 38 or seal 38B of the bearing system 38A out of the bearing housing 32. In this embodiment, all of the service tool components are coupled to the rotor shaft 40 and bearing assembly 38 without any external fixtures. All components in this embodiment are man portable and easily maneuvered into field site gas turbine repair zones without the need for cranes or other hoisting devices.

Additional structural and operational details of a first embodiment bearing system service tool 70 are shown in FIGS. 5-9. Bearing ring 80 is secured to the bearing assembly 38 outer axial face by bearing ring fasteners 82. It should be understood that while further description of use of the service tool 70 will focus on bearing 38 removal, the tool is also capable of removing the tandem mounted seal 38B or the bearing system 38A Rotor shaft cap 130 abuts and is concentric with the rotor shaft 40. The shaft cap 130 is coupled to the shaft end face 42 by rotor cap rods 132, which are threaded into the female apertures 44. The shaft cap 130 aligns the internal diameter surface of the bearing 38 during bearing service maintenance and provides a convenient journal surface for resting a bearing assembly 38 immediately before bearing installation or after its removal.

The shaft studs 90 each have a distal female threaded end 90 that mates with a corresponding male threaded rotor cap rod 132 and a male threaded proximal end 94 that is secured to a hub plate 102 puller hub assembly 100 by a shaft stud fastener 96. The hub plate 102 is in turn rigidly coupled to hydraulic mounting plate 104 by hub fasteners 106. The hydraulic units 110 are coupled to the hydraulic mounting plate 104, where they reciprocate hydraulic puller rods 121. Those hydraulic puller rods 121 are in turn coupled to the bearing puller rods 120 by puller rod couplers 122. In turn the bearing puller rods 120 are coupled to the bearing ring 80. The coupled two piece corresponding bearing puller rods 120 and hydraulic puller rods offer the advantage of shorter individual length for maneuvering around the turbine repair site prior to assembly. However, longer single piece puller rod assemblies or shorter multiple piece rod assemblies may be substituted for the two-piece assembly 120/121 of the embodiment shown in FIG. 5.

Figure 7:
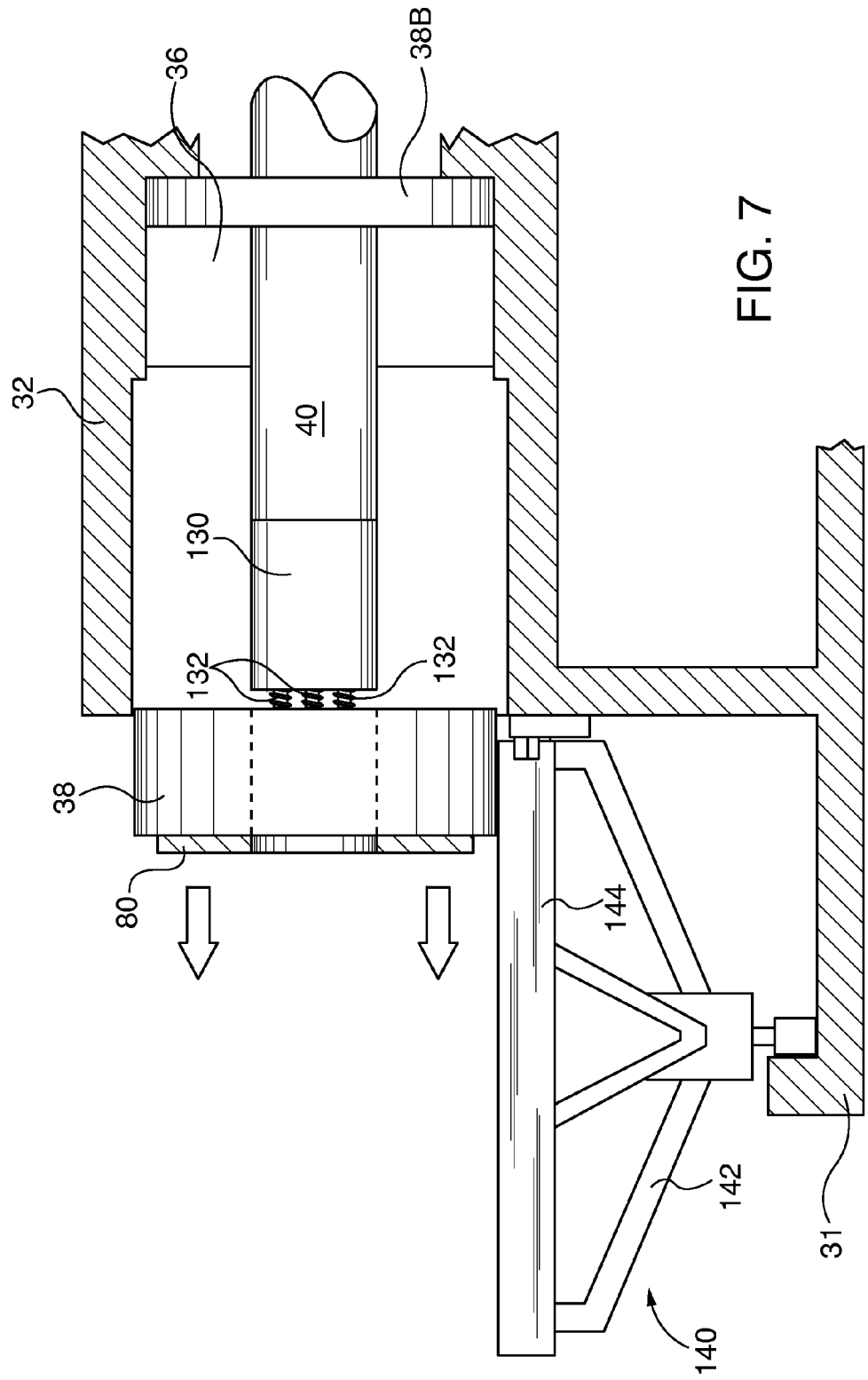
FIG. 7 is a detailed elevational view of the bearing system service tool of FIG. 5 after the bearing assembly is removed from the turbine shaft.
Figure 8:
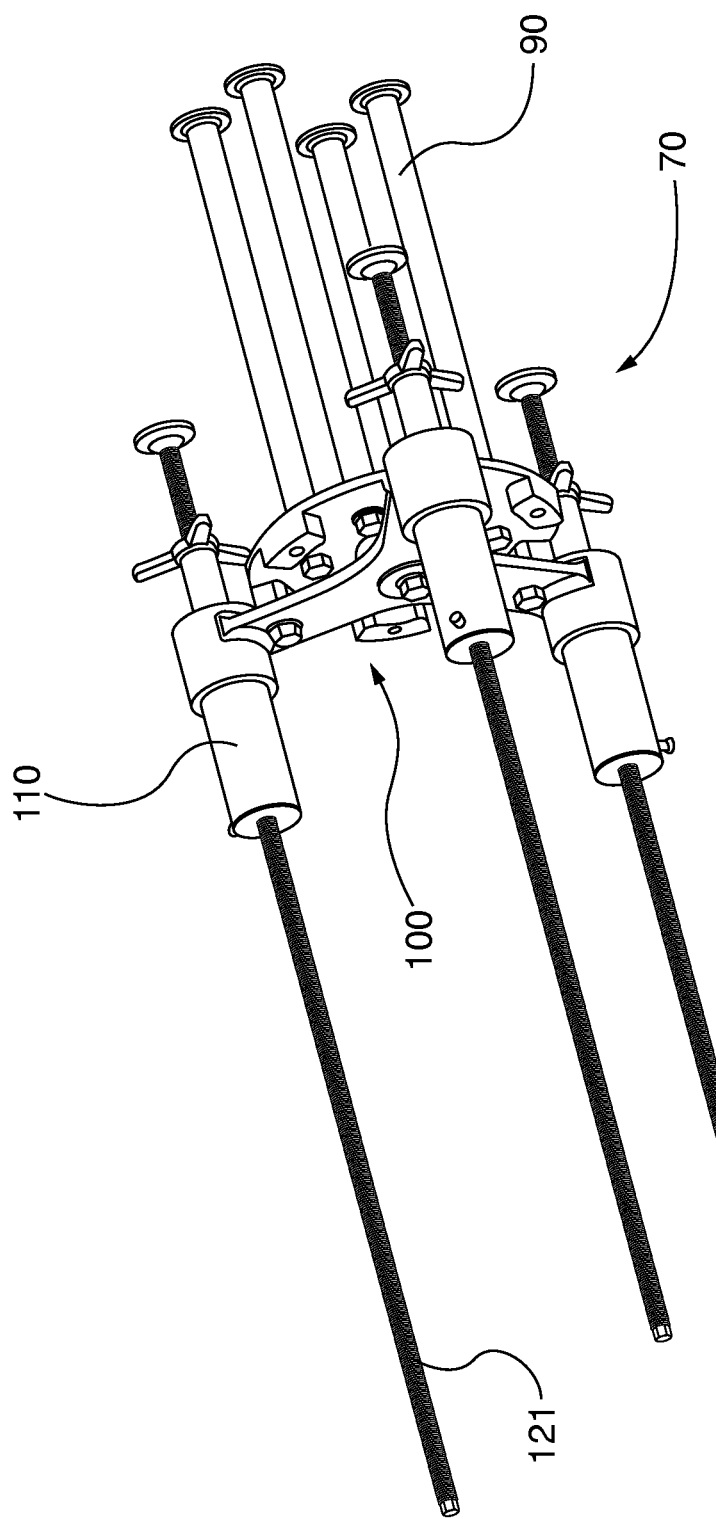
FIG. 8 is a perspective view of the bearing system service tool of FIG. 5.
Figure 9:
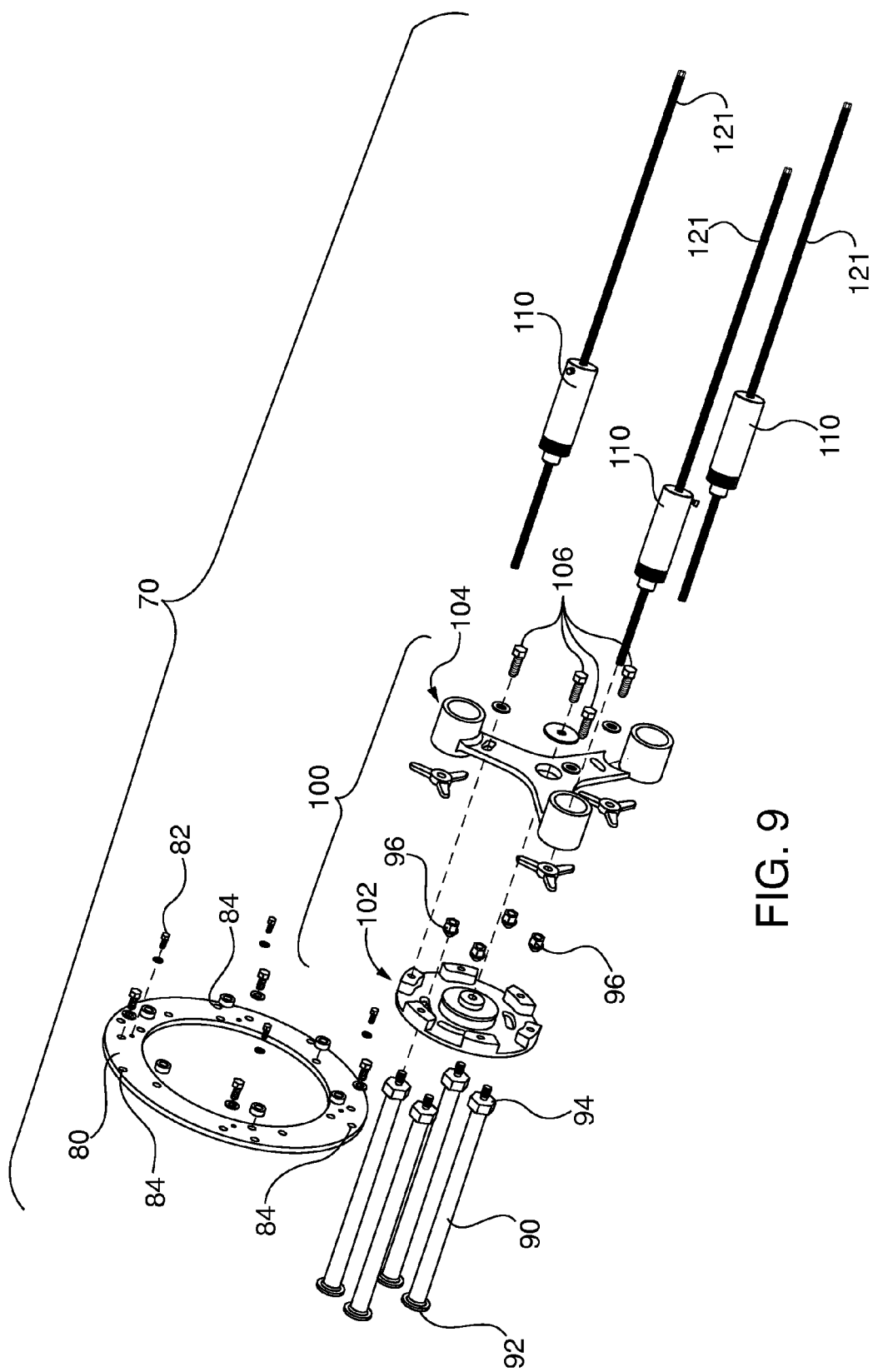
FIG. 9 is an exploded view of the bearing system service tool of FIG. 5.
Figure 10:
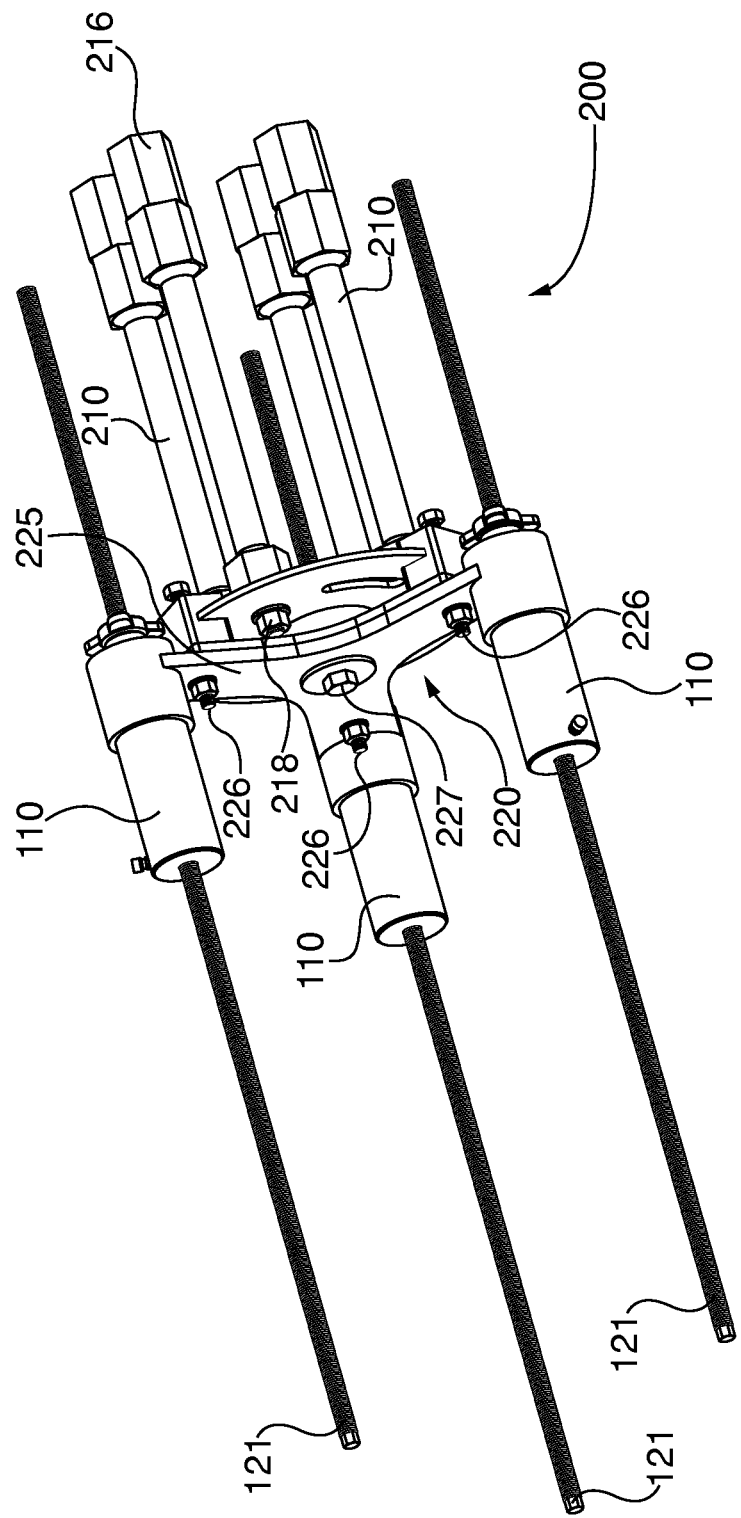
FIG. 10 is a perspective view of a second embodiment of a bearing system service tool of the invention.
Figure 11:
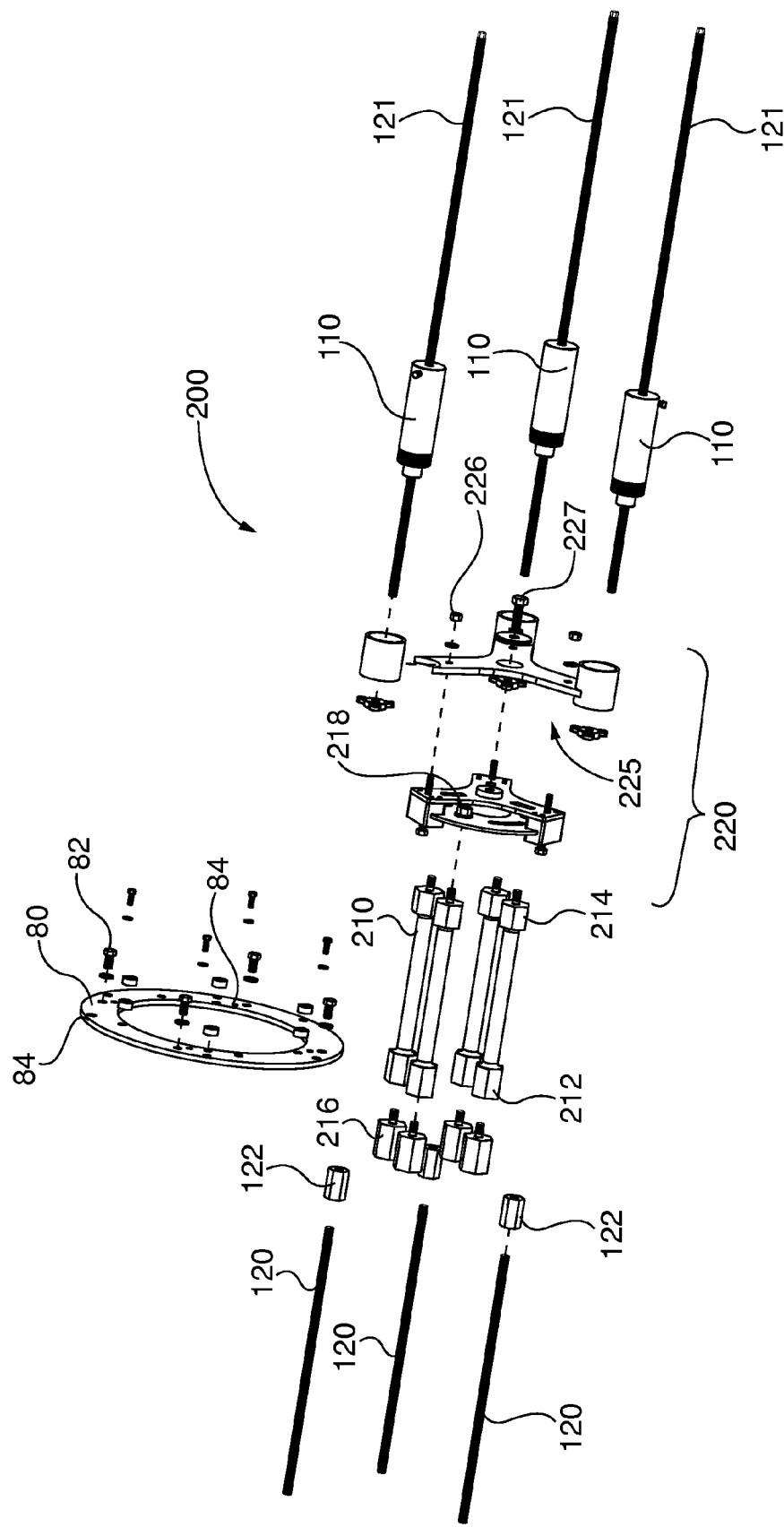
FIG. 11 is an exploded view of the bearing system service tool of FIG. 10.

Bearing support bracket 140 includes a truss support structure 142 and a fixed non-moving bearing skid 144. As shown in FIG. 7 the bearing assembly 38 may be rested upon the bearing support bracket 140 after its removal from the shaft cap 130 or prior to insertion on the cap. The bearing support bracket interfaces with the turbine exhaust flange 31 and the bearing housing end surface 34 without the need for external support.

Figure 12:
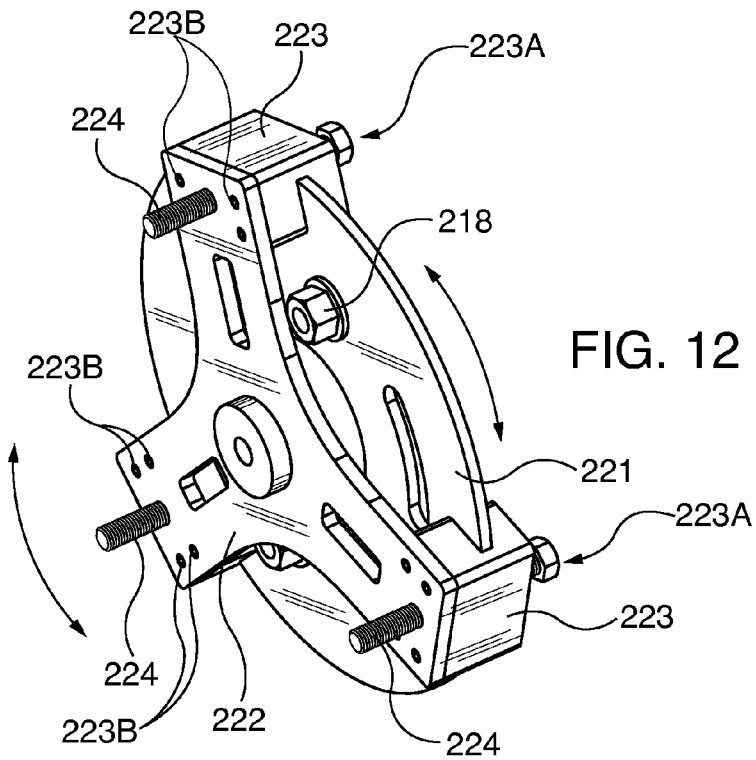
FIG. 12 is a detailed perspective view of components forming a pivoting hub assembly of the bearing system service tool of FIGS. 10 and 11.

A second embodiment of a bearing system service tool 200 of the invention and its methods for use are shown in FIGS. 10-20. The bearing system service tool 200 embodiment accommodates non-indexed alignment of the bearing system 38A bearing assembly 38 or the seal 38B and the rotor shaft end face apertures 44 with a pivoted or "floating" hub assembly 220 that allows coupling of the rotor shaft cap 130 and the bearing ring 80, no matter what their relative angular orientation of bolt patterns. As shown in FIG. 12 the floating hub assembly 220 provides for a range of radial play to accommodate non-concentric alignment between the bearing ring 80 and rotor shaft cap 130 which may occur during the bearing service tool 200 assembly, in additional to the rotational alignment flexibility.

In the second embodiment bearing system service tool 200 the respective shaft studs 210 distal ends 212 are coupled to a corresponding one of the extension studs 216, which are in turn intermediate the rotor cap rods 132. Shaft studs 210 proximal ends 214 are coupled to the pivoting hub assembly 220 disc 221 by extension nuts 218. As shown in FIG. 12 the disc 221 is coupled to disc retainer plate 222 and captured by retainer blocks 223. The retainer blocks restrain radial and axial movement of disc 221 but allow disc rotation. The stop screws 223A can be selectively tightened to press against the disc 221 if it is desired to restrict or prevent disc rotation. The retainer blocks 223 are coupled to the disc retainer plate 222 by screws 223B. The hydraulic mounting plate 225 retains the hydraulic units 110 and is coupled to the disc retainer plate 222 by hydraulic mounting plate nuts 226 and the studs 224. A central mounting plate bolt 227 is a rotational journal for the disc 221. The bearing system service tool 200 is coupled to the bearing ring 80 in a similar manner as the first embodiment service tool 70.

Figure 13:
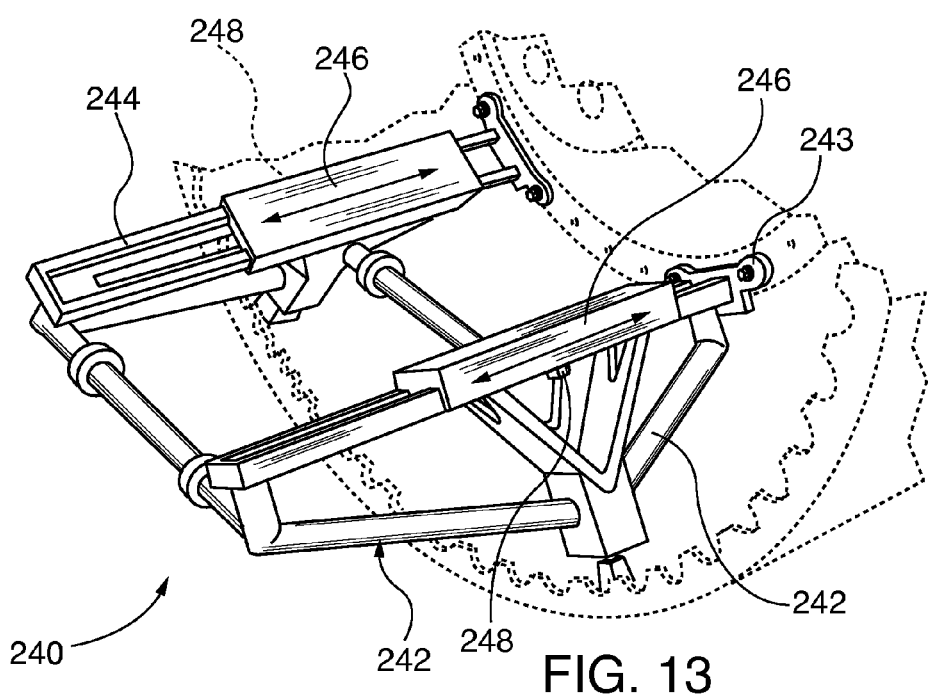
FIG. 13 is a perspective view of another embodiment of a bearing system support bracket of the invention.

FIG. 13 shows a second embodiment bearing support bracket 240. The truss support structure 242 is fastened to the bearing housing 32 and has a flange 243 that contacts the bearing housing end surface 34. The opposite end of truss support structure 242 rests on the turbine exhaust inner surface near the flange 31. A slotted track 244 on each flanking side of the support bracket 240 supports a bearing slider 246, which in turn is retained within the track by slider retainer screw 248. The support structure 242 may incorporate leveling screws (not shown) for leveling each bearing slider 246. The flat top surface of each slider 246 is oriented at an angle that is tangential to a bearing system 38A bearing assembly 38 or seal 38B outer circumference. The sliders 246 facilitate insertion and extraction of a bearing assembly 38 or seal 38B as it is aligned with the rotor cap 130.

Figure 14:
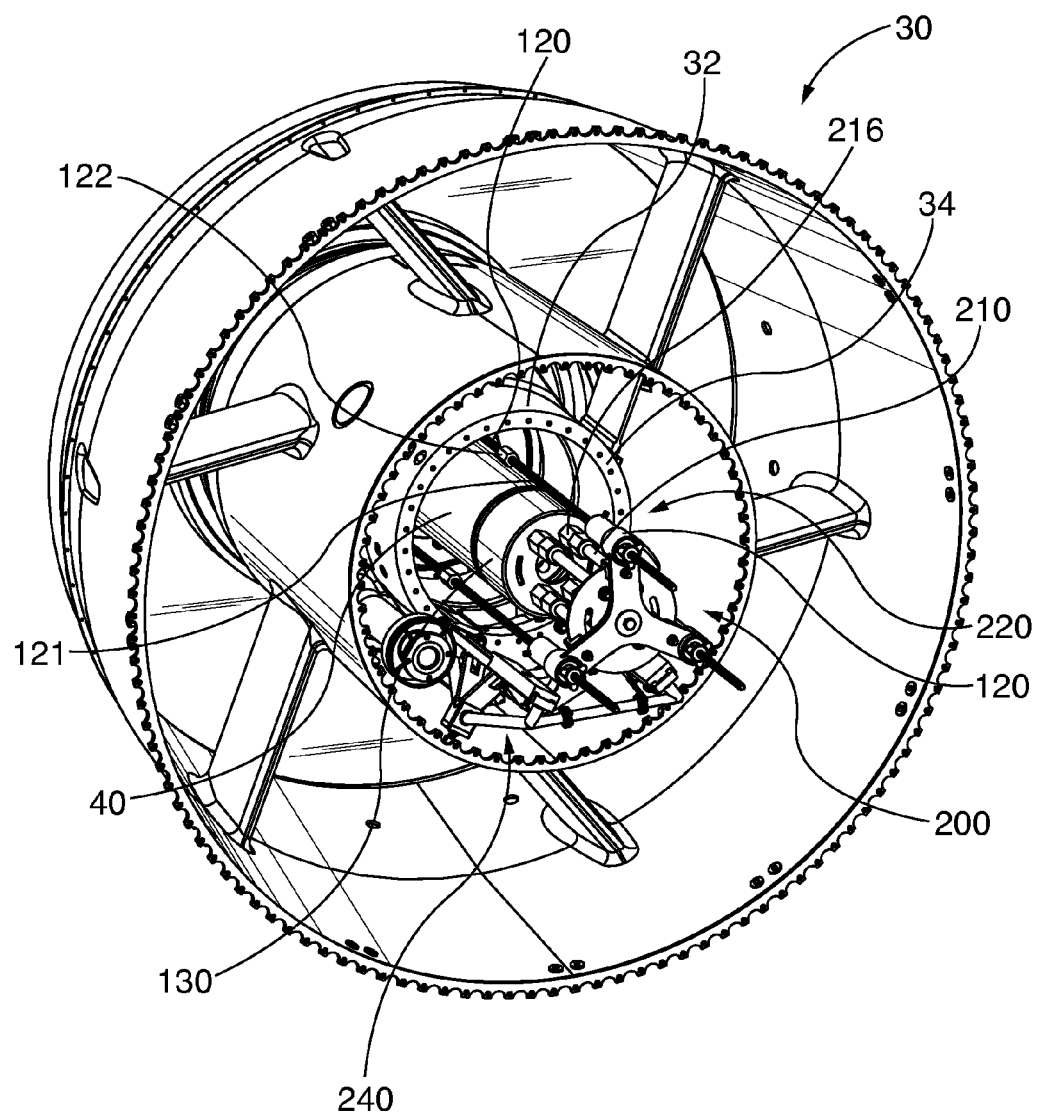
FIGS. 14 and 15 are perspective views showing bearing assembly removal with the bearing system tool of FIGS. 10 and 11, in accordance with a method of the invention.
Figure 15:
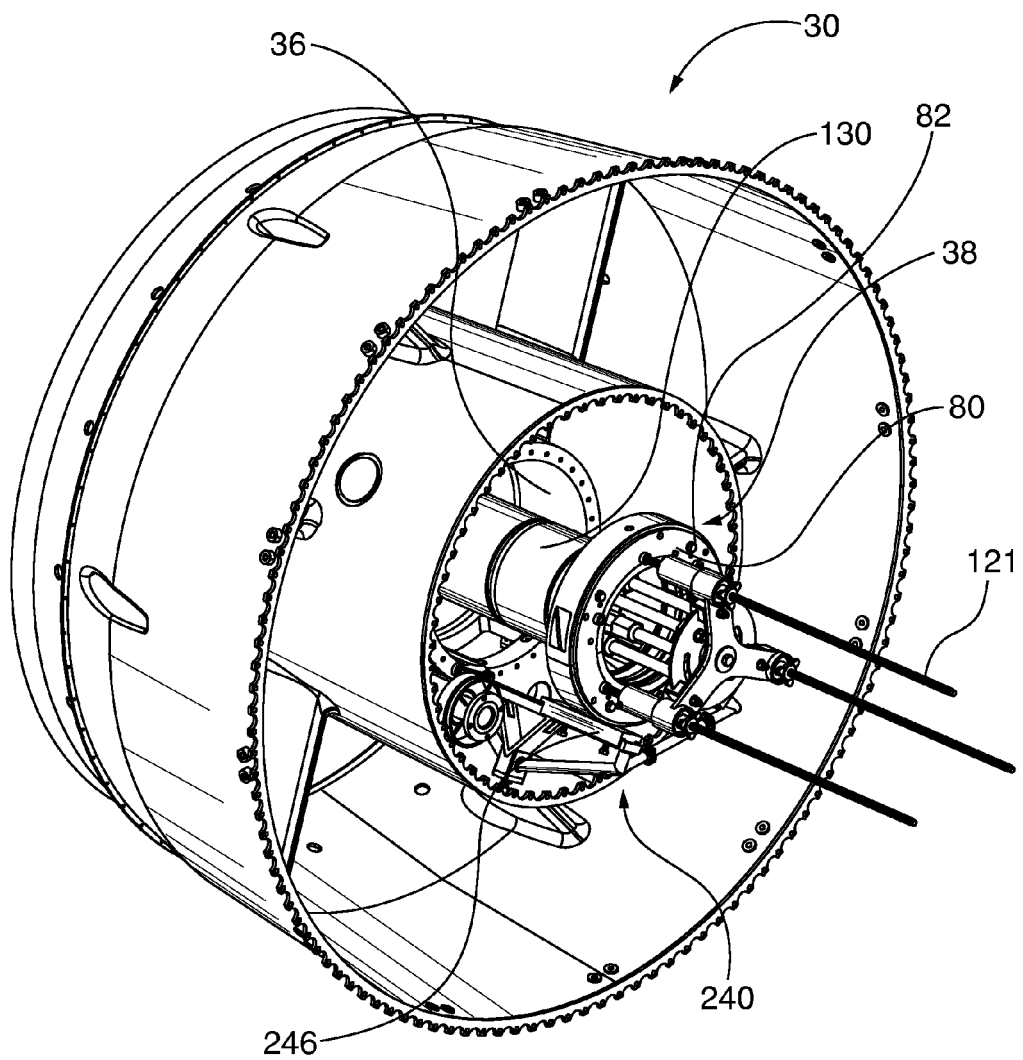

FIGS. 14 and 15 show bearing assembly 38 removal from the bearing housing 34 of a turbine single piece exhaust 30. The rotor cap threaded rods 132 and rotor cap 130 is installed on the rotor shaft 40 and is subsequently secured in assembled condition by the extension studs 216. Similarly the bearing ring 80 is installed on the outer axial face of the bearing assembly 38 with the bearing cap fasteners 82. The bearing support bracket 240 is installed within the bearing housing tunnel portion of the SPEX 30. The remainder of the bearing replacement tool 200 components is assembled. The shaft studs 210 are coupled to the extension studs 216 and the pivoting hub assembly 220 is affixed to the shaft stud distal ends 212. Bearing puller rods 120 are coupled to the bearing ring 80, with their distal ends coupled to the hydraulic unit puller rods 121 by puller rod couplers 122 after the hydraulic units 110 are coupled to the pivoting hub assembly 220. As previously described the pivoting hub 220 accommodates any relative index position of the shaft studs 210 and the bearing puller rods 120 and radial concentricity variations.

The hydraulic units 110 are actuated to bias and retract the bearing assembly 38 from the bearing recess 36. If the hydraulic units do not have sufficient axial travel to extract the bearing assembly 38 all the way to the rotor cap 130 then part way through the extraction the bearing puller rods 120 can be removed from the bearing ring 80 and the hydraulic unit puller rods 121 are directly substituted for them. When the bearing assembly 38 rests on the outer end of the rotor shaft cap 130 the bearing system service tool 200 components are removed from the bearing assembly and rotor 40, with the bearing assembly resting on the bearing support bracket 240 bearing support bracket sliders 246. The sliders 246 can be conveniently retracted away from the SPEX 30 so that the now separated bearing assembly 38 can be removed from the service area by service personnel. As previously noted, the same service tool 200 and methods for use can be used to retract the seal 38B of the bearing system 38A.

Figure 16:
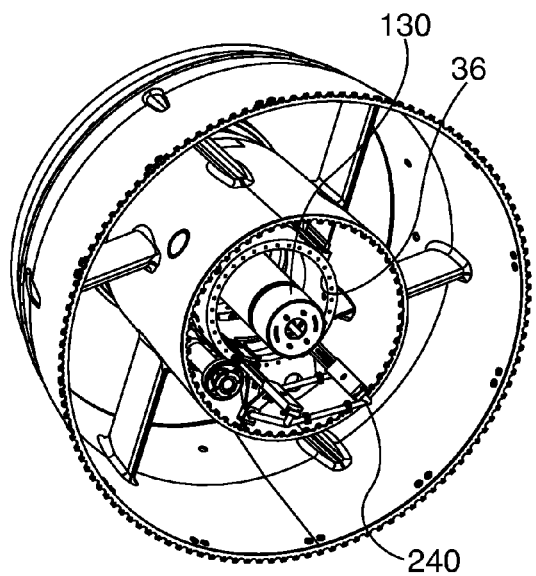
FIGS. 16-20 are perspective views showing bearing assembly installation with the bearing system tool of FIGS. 10 and 11, in accordance with a method of the invention.
Figure 17:
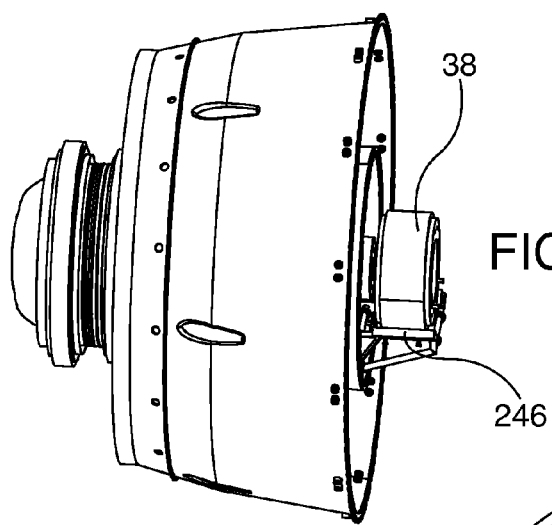
Figure 18:
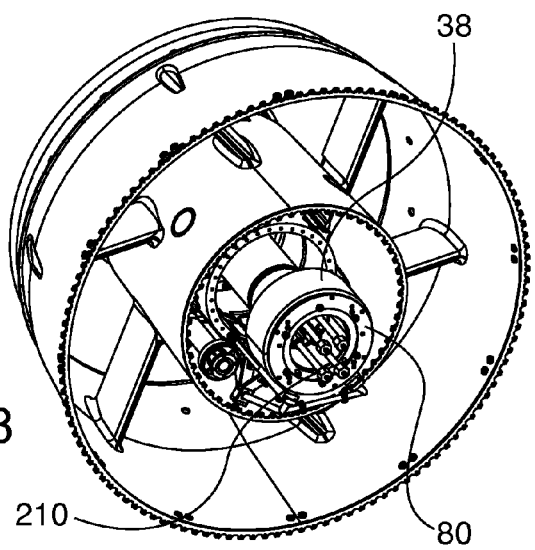
Figure 19:
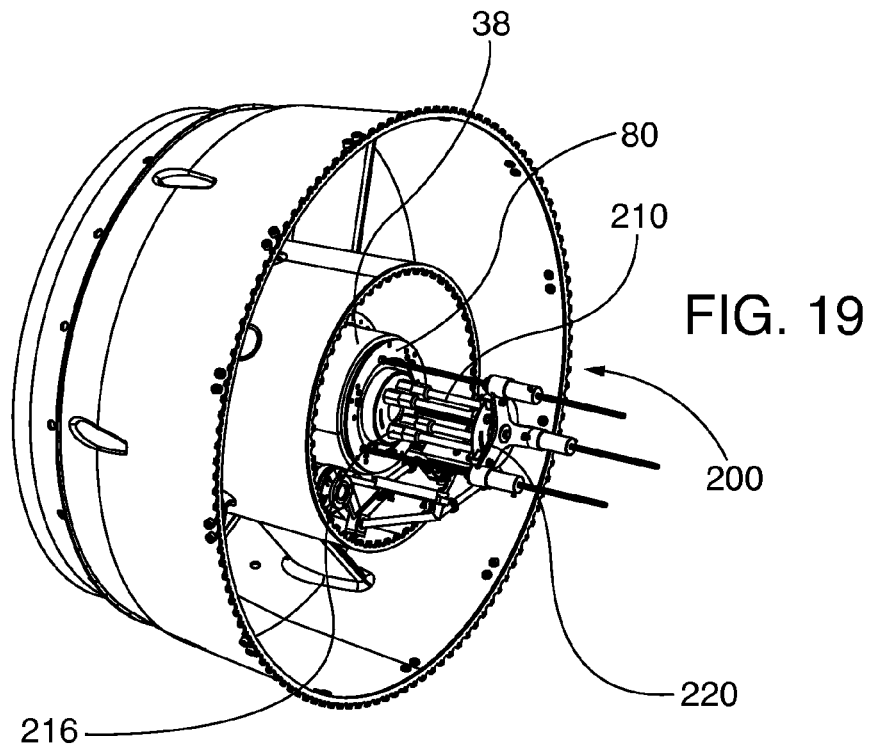
Figure 20:
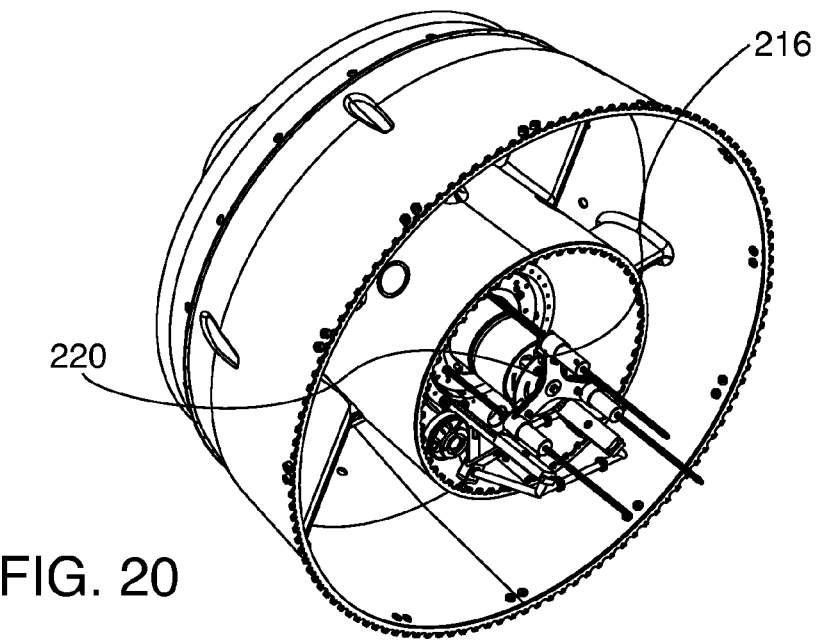

FIGS. 16-20 show installation of a bearing assembly 38 into a SPEX 30 bearing recess 36 with the bearing system service tool 200. Presumably the bearing seal 38 B of the bearing system 38A was previously installed into the bearing recess 36. In FIG. 16 the rotor cap 130 and bearing support bracket 240 are installed as previously described. In FIG. 17 a bearing assembly 38, preferably with pre-installed bearing ring 80, is placed on the bearing support bracket sliders 246 of FIG. 13 and the sliders translated toward the SPEX 30 so that the bearing assembly is aligned concentrically with the rotor shaft 40 and rotor cap 130. If desired, the alternate embodiment bearing support 140 may be substituted for the bearing support 240. The extension studs 216 and shaft studs 210 are installed as previously described, as shown in FIG. 18. The remainder of the service tool 200 components are installed and the bearing 38 is biased within the bearing housing 32 toward the bearing recess 36 with the hydraulic units 110 (FIG. 19). When the bearing assembly 38 is inserted into the bearing housing 32 the shaft studs are removed and the pivoting hub assembly 220 is affixed directly to the extension studs 216. The bearing puller rods 120 are also removed and the hydraulic unit puller rods 121 are directly affixed to the bearing ring 80, as shown in FIG. 20. The hydraulic units 110 then bias the bearing assembly 38 into its installed position within the bearing recess 36 in front of the seal 38B, whereupon the service tool 200 components are removed.

Although various embodiments that incorporate the teachings of the invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. For example, other externally powered or manually powered bias force generating mechanisms can be substituted for the hydraulic units 110, including by way of non-limiting example pneumatic cylinders, screws, rack and pinion mechanisms, as well as pawl and ratchet mechanisms. The bias force generating mechanism can be coupled to the shaft and bearing system bearing or seal directly (e.g., without the rotor cap 130 or bearing ring 80) or indirectly, or in conjunction with external biasing elements such as the previously described external bearing service mechanism 50 with sled 52. The bearing system service tool of the invention is preferably used for bearing or seal removal, but does not need to be utilized for both bearing system seal/bearing removal and installation: it may be used selectively for either purpose alone. Similarly, the service tool may be used selectively for installation or removal of either the seal or the bearing of the bearing system in any combination.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A gas turbine engine bearing system service apparatus for a gas turbine having a rotor shaft and a shaft supporting bearing system, including a bearing component and a seal component that is slidably mounted on the shaft and captured within a bearing housing, comprising:
    a first member adapted for coupling to a gas turbine rotor shaft;
    a second member adapted for coupling to a gas turbine shaft bearing system component;
    a biasing force generating unit coupled to the first and second members, for biasing the first and second members relative to each other so as to slide the bearing system component relative to the shaft;
    a hub assembly interposed between the first and second members, with the biasing force generating unit coupled thereto; and
    the hub assembly comprising first and second hub plates pivotally coupled to each other along a pivot axis, the first hub plate coupled to the first member and the second hub plate coupled to the second member, so as to facilitate selective rotational indexing between the first and second members.

2. The apparatus of claim 1, comprising a rotor cap interposed between the rotor shaft and the first member.

3. The apparatus of claim 1, the first member comprising shaft studs extending axially away from the rotor shaft.

4. The apparatus of claim 1, comprising a bearing ring interposed between the bearing system component and the second member.

5. The apparatus of claim 1, the second member comprising elongated rods coupled to and extending axially away from the bearing system component.

6. The apparatus of claim 1, the biasing force generating unit comprising at least one hydraulic unit capable of axially translating the first and second members relative to each other.

7. The apparatus of claim 1, comprising the first and second hub plates radially displaceable relative to the pivot axis, so as to facilitate concentricity alignment variances between the first and second members.

8. The apparatus of claim 1, comprising a bearing support adapted for external coupling to a gas turbine engine bearing housing, having a pair of sliders for resting a gas turbine bearing system component thereupon in axial alignment with the shaft when the bearing system component is not slidably engaging the shaft.

9. A gas turbine engine bearing system service apparatus for a gas turbine having a rotor shaft and a shaft supporting bearing system, including a bearing component and a seal component that is slidably mounted on the shaft and captured within a bearing housing, comprising:
    a rotor cap adapted for coupling to a gas turbine rotor shaft concentrically therewith having an outer circumferential profile adapted for slidable engagement with a bearing system component;
    a first member adapted for coupling to the rotor cap, having at least one shaft stud having a distal end coupled to the rotor cap and a shaft stud proximal end;
    a bearing ring coupled to an outer axial face of a shaft supporting bearing system component;

a second member adapted for coupling to the bearing ring, having at least one bearing rod having a distal end coupled to the bearing ring and a bearing rod proximal end;

a pivoting hub assembly having first and second hub plates pivotally coupled and radially displaceable relative to each other along a pivot axis, the first hub plate coupled to the at least one first member shaft stud proximal end, and the second hub plate coupled to the at least one second member bearing rod distal end, so as to facilitate selective rotational indexing and concentricity alignment variances between the first and second members; and at least one biasing force generating hydraulic unit coupled to the pivoting hub assembly, for biasing the first and second members relative to each other, so as to slide the bearing system component relative to the shaft.

10. A method for slidably moving a gas turbine engine shaft supporting bearing system, including a bearing component and a seal component, that is capable of being retained within a bearing housing relative to an axially fixed position rotor shaft, comprising:

coupling a first member to a gas turbine rotor shaft; coupling a second member to a gas turbine shaft bearing system component; coupling a biasing force generating unit to the first and second members;

biasing the first and second members relative to each other with the biasing force generating unit, so as to slide the bearing system component relative to the shaft; and selectively rotationally indexing the first and second members relative to each other utilizing a pivoting hub interposed between the first and second members, the hub having a first hub plate coupled to the first member and a second hub plate coupled to the second member.

11. The method of claim 10, comprising coupling a rotor cap to the rotor shaft and coupling the first member to the rotor cap.

12. The method of claim 10, the first member comprising at least one shaft stud coupled to an exposed axial face of the rotor shaft and extending axially away from the rotor shaft.

13. The method of claim 10, comprising coupling a bearing ring to an exposed axial face of the bearing system component and coupling the second member to the bearing ring.

14. The method of claim 10, the second member comprising at least one elongated rod coupled to and extending axially away from the bearing system component.

15. The method of claim 10, the biasing force generating unit comprising at least one hydraulic unit capable of axially translating the first and second members relative to each other.

16. The method of claim 10, comprising coupling a bearing support externally on the gas turbine engine bearing housing, the external bearing support having a pair of sliders for resting a gas turbine bearing system component thereupon in axial alignment with the shaft when the bearing system component is not slidably engaging the shaft.

17. The method of claim 10, comprising removing or installing a gas turbine shaft support bearing system component into a bearing housing by:

coupling a rotor cap to the rotor shaft;

coupling a plurality of first member shaft studs coupled to an exposed axial face of the rotor cap and extending the shaft studs axially away from the rotor shaft;

coupling a bearing ring to an exposed axial face of the bearing system component;

coupling a plurality of second member elongated rods to the bearing ring and orienting the rods axially extending away from the bearing system component; and coupling a biasing force generating unit hydraulic unit to the pivoting hub and one of the plurality of first and second members, and biasing them relative to each other, so as to slide the bearing system component relative to the shaft.

* * * * *